Oct. 3, 1967  R. B. ABERNETHY  3,344,606
RECOVER BLEED AIR TURBOJET
Filed Sept. 27, 1961  3 Sheets-Sheet 1
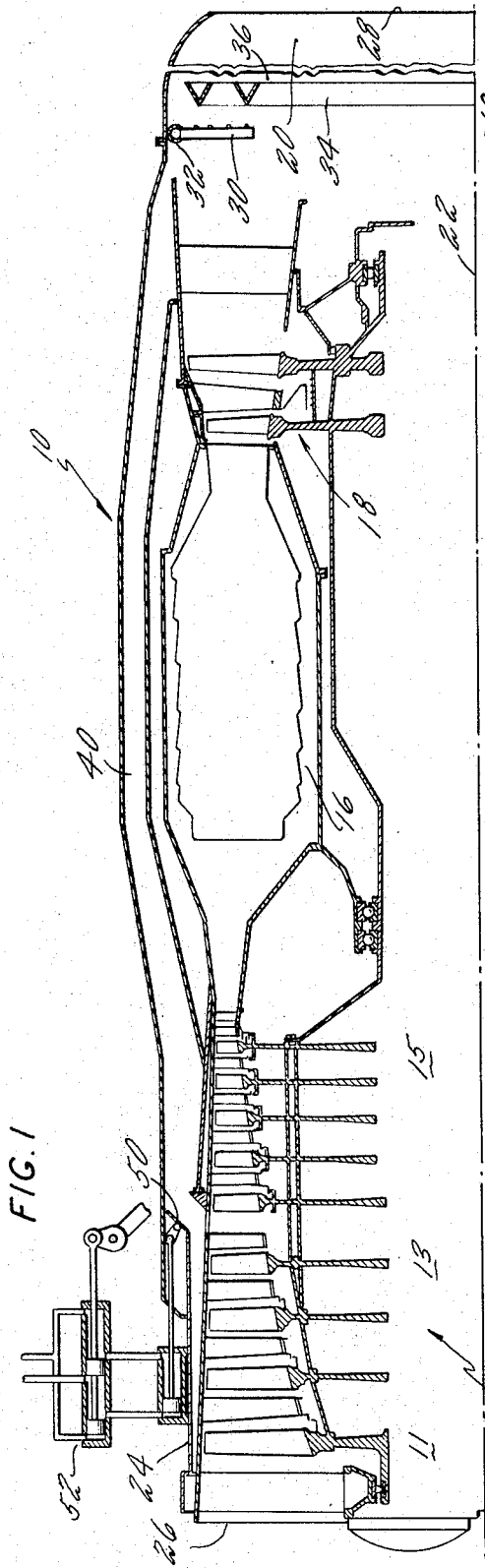
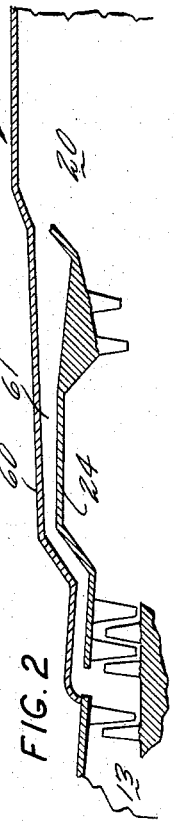
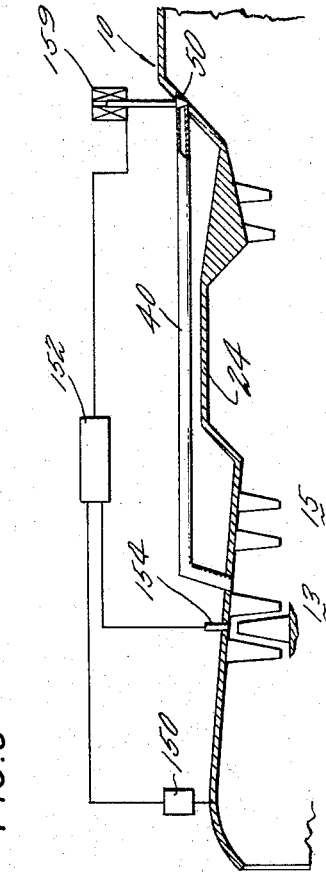
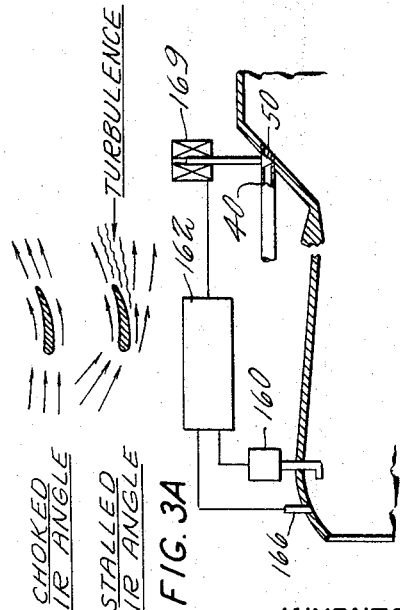
INVENTOR
ROBERT B. ABERNETHY
BY Vernon F. Hauschild
ATTORNEY INVENTOR
ROBERT B. ABERNETHY
BY Vernon J. Hauschild
ATTORNEY

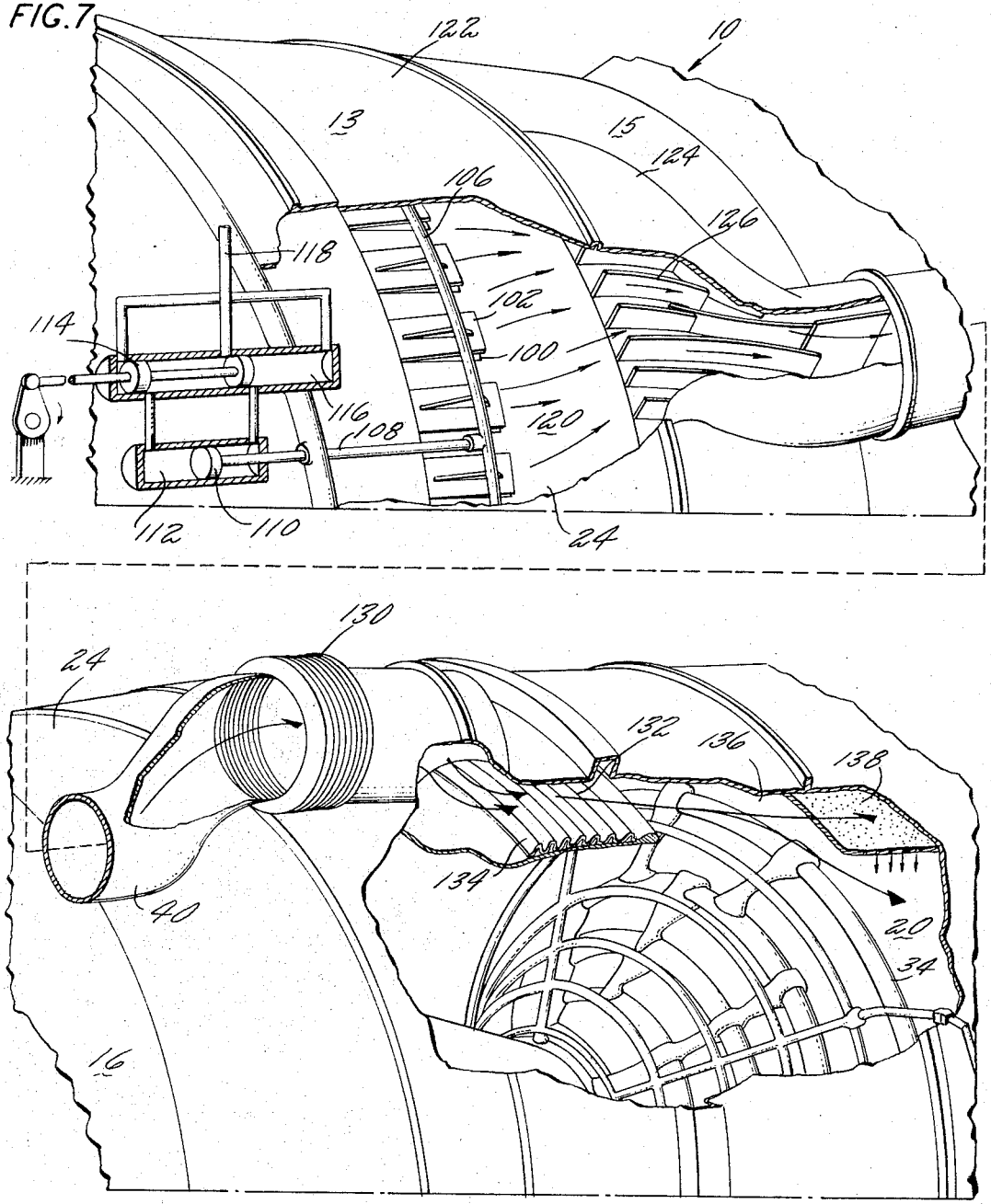

United States Patent Office 3,344,606
Patented Oct. 3, 1967

3,344,606
RECOVER BLEED AIR TURBOJET
Robert B. Abernethy, North Palm Beach, Fla., assignor to United Aircraft Corporation, East Hartford, Conn., a corporation of Delaware
Filed Sept. 27, 1961, Ser. No. 141,571
6 Claims. (Cl. 60—241)

This invention relates to turbojet engines with afterburners and more particularly to a recover bleed air engine wherein, during periods of high flight speed, air is bled from an intermediate compressor stage into the afterburner for reheating prior to discharge.

It is a characteristic of turbojet engines that at high supersonic flight speeds performance deteriorates primarily because of ram air temperature rise.

It is an object of this invention to improve the performance of a conventional turbojet engine with afterburner during high supersonic flight speed operation by bleeding a portion of the compressor air from an intermediate compressor stage and recovering the air in the afterburner for reheating therein prior to discharge to atmosphere with the remainder of the engine exhaust gases.

It is an object of this invention to improve the thrust generating quality of a turbojet engine with afterburner during high supersonic flight speed operation and to improve the compressor efficiency, the compressor surge margin and the compressor blade and vane fatigue problem.

Other objects and advantages will be apparent from the specification and claims and from the accompanying drawings which illustrate an embodiment of the invention.

FIG. 1 is a side view of my recovery bleed air turbojet engine partially broken away to better illustrate construction and operation.

FIG. 2 is a partial enlarged portion of my recovery bleed air turbojet engine illustrating an alternate bleed system.

FIGS. 3 and 3a are partial showings of my invention illustrating alternate control means for the bleed air flow.

FIG. 6 is a blade cross section taken through the compressor blades of FIG. 1 to illustrate the air flow across a compressor blade at optimum air angle, choked air angle and stalled air angle.

FIG. 7 is a perspective fragmentary showing of a preferred embodiment of my recover bleed air engine.

Figure 4:
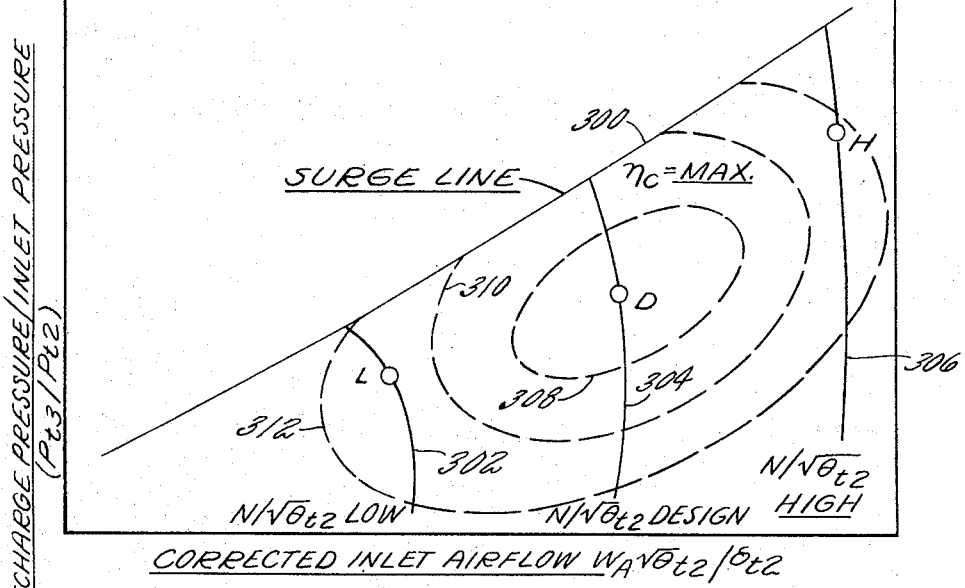
FIG. 4 is a compressor map of a typical turbojet engine compressor used with an afterburning turbojet engine which does not utilize my invention.

My recovery bleed air engine 10 is shown in FIG. 1 and comprises single rotor compressor 14, which has front, intermediate and rear stages, 11, 13 and 15, respectively, combustion chamber section 16, turbine section 18, and afterburner 20. Elements 14 through 20 are preferably coaxial about engine axis 22 and are enveloped within engine case 24 which is preferably of circular cross section and has engine inlet 26 and outlet 28 so that atmospheric air which enters inlet 26 is compressed in passing through compressor 14, has heat added thereto in passing through combustion section 16, has sufficient energy extracted therefrom to drive compressor 14 in passing through turbine 18 and is reheated in afterburner 20 prior to passing to atmosphere through outlet 28 to perform a thrust generating function. Engine 10 may be of the conventional type more fully described in U.S. Patents Nos. 2,747,367 and 2,711,631 which includes a plurality of circumferentially positioned fuel spray bars 30 which are fed fuel from fuel manifold ring 32 and which are positioned upstream of flameholder unit 34 such that atomized fuel which leaves the fuel spray bar 30 is mixed with air and engine exhaust gases in afterburner 20 to define a combustion zone 36 downstream of flameholders 34. Engine outlet 28 may be of the variable area nozzle type more fully disclosed in U.S. Patents Nos. 2,974,480 and 2,910,828 while afterburner 20 may be as disclosed in U.S. Patent No. 2,974,486.

To understand the problem which my recover bleed air engine serves to cure, consideration will first be given to the theoretical aspects of compressor and turbojet engine performance.

At high supersonic flight speeds, conventional turbojet engine performance deteriorates primarily because of ram air temperature rise. As a result the thrust output drops because of insufficient airflow, compressor tolerance to surge is poor, and low compressor efficiency occurs resulting in high fuel consumption. Also, the compressor blades are subjected to high stress from the combination of high rotational speed and flutter from rotating stall in the front stages.

FIG. 4 is a compressor map showing compressor surge line 300, corrected compressor rotor speed lines 302, 304, and 306, and compressor adiabatic efficiency lines 308, 310 and 312 illustrating the performance of a typical axial-flow multi-stage compressor designed for a high speed turbojet engine. Compressor operation is stable below the surge line 300 and points L, D and H represent three typical engine-compressor equilibrium points. The parameters shown in the FIG. 4 compressor map are: $P_{t3}$ equals compressor discharge total pressure, $P_{t2}$ equals compressor inlet total pressure, $W_A$ equals weight rate of airflow in lb./sec., $\theta_{t2}$ equals the ratio of actual inlet total temperature to design inlet total temperature, $\delta_{t2}$ equals the ratio of actual inlet total pressure to design inlet total pressure, $\eta_c$ equals compressor adiabatic efficiency, N equals compressor rotor speed in r.p.m., $W_A\sqrt{\theta_{t2}}/\delta_{t2}$ inlet equals corrected inlet airflow, and $N\sqrt{\theta_{t2}}$ equals corrected rotor speed.

Point L is a low corrected airflow condition that might occur at part power at sea level operation but which can also occur at maximum supersonic flight speeds at maximum power. Point H is a high corrected airflow condition that corresponds to sea level operation at maximum power. Point D, between these extremes, represents the design point or maximum efficiency condition. Point D is called the design point because the compressor vanes and blades are designed for near optimum air angle at this condition, and the airfoil areas are sized for this design corrected airflow. The result, a compromise between the requirements of points L and H, is that maximum efficiency occurs at point D.

Point H is directly related to both corrected volume airflow and Mach number. The frontal area of the compressor is designed having lower corrected airflow and therefore the front compressor stages are said to be "choked." As the air moves through the compressor, more compression per stage is accomplished at H than at D because of the higher rotational speed of the blades. Therefore, in the rear compressor stages, the air density is higher than design and the corrected volume airflow is lower than design so that the areas defined by the area compressor stages are too large so that the stages are said to be "stalled." In general, stall is caused by less than design corrected volume airflow while choke is the result of too much volume airflow. Maximum compressor efficiency occurs near the optimum air angle.

Referring to FIG. 6 we see illustrations of optimum air angle, choked air angle and stalled air angle with respect to a cross-sectional showing of a compressor blade.

As previously stated, point L of FIG. 4 might be either a low-flight-speed part-throttle equilibrium point for a turbofan engine or might also be a turbojet engine equilibrium point at maximum supersonic flight speeds at maximum power. At either of these conditions, the corrected airflow is less than design in the front compressor stages and therefore the front stages are stalled while the rear compressor stages are choked since the compressor work per stage is less than at D so that the density is low and the corrected volume high. It will therefore be seen that the condition of the front and rear compressor stages at point L is the reverse of the conditions at point H and that at point L the airflow through the compressor is restricted at the rear stages of the compressor.

This flow restriction is not a problem at equilibrium point L at the part-throttle low-flight-speed condition because both flow and power can be increased by advancing the throttle. However, at the point L maximum flight speed, maximum power equilibrium condition, the flow restriction in the rear compressor stages not only restricts airflow through the turbojet engine but also limits the thrust output of the engine. Solving the flow restriction problem at the second point L condition by advancing the throttle is not possible because such would increase both turbine inlet temperature and rotor speeds and such would be catastrophic since each of these parameters are at their thermal stress limits.

It will be further noted by referring to FIG. 4 that equilibrium point L is close to the surge line and because of the problems associated with the wide flow difference between points L and H, slight increases in engine inlet distortion, slight compressor damage by foreign body ingestion or rocket exhaust could cause surge and engine instability.

The compressor adiabatic efficiency shown as dotted lines 308, 310 and 312 in FIG. 4 illustrate that equilibrium point L is at a compressor efficiency region less than optimum point D and as a result thereof engine performance suffers because engine thrust specific fuel consumption is inversively related to compressor efficiency.

In addition to the thrust restriction, low surge margin and inefficiency problems just discussed caused by point L flow restriction, the compressor front stages, which are operating in stall or close to stall, are subjected to flutter fatigue from the cyclic separation and attachment of the air stream lines passing thereover.

Applicant's invention relates to the relieving of these thrust, surge, efficiency, and vane fatigue problems which are caused by flow restriction in the rear compressor stages at the maximum speed, maximum power equilibrium point L operating condition.

In the past, several approaches have been suggested to solve this flow restriction problem. It has been suggested that the problem may be solved by enlarging the engine and compressor. This is not an acceptable solution, however, since extra thrust is not required at all flight conditions and the extra engine size brings about increased frontal area which results in drag penalties and also brings about weight increases which reduce the aircraft payload.

A second solution to the flow blockage problem has been suggested in the form of mechanical rotation of the stator vanes in the front and rear compressor stages to improve the air angles. This proposed solution has several severe disadvantages in that the stator control must be precise and the angular rotation would have to be different for each compressor stage. Consequently, an intricate control mechanism would be required and malfunction of the control would be disastrous. In view of the complexity of the control mechanism, leakage through the actuating mechanism would be almost impossible to eliminate. Further, engine weight would be substantially increased thereby and it would be impossible to rotate the stator vanes to an angle which would be optimum for both stator vane angle and its associated blade air angle, whereas, my recover bleed air engine rematches both vanes and blades.

A third possible solution to the flow blockage problem has been suggested wherein the entire turbojet engine would be bypassed and the afterburner would be utilized as a ramjet. Such an engine configuration would be called a turbo-ramjet and it is both large and heavy because it must have sufficient capacity to pass about equal corrected air volume either through the turbojet engine or around it to the afterburner. Furthermore, the combustion efficiency of such a power plant would be low relative to a turbojet engine.

A fourth possible solution to the flow blockage problem has been suggested and includes pre-cooling the air entering the compressor by evaporating a liquid which would be injected into the compreessor inlet. A water-alcohol solution is often suggested. There are several disadvantages to the pre-cooling suggestion, namely, the liquid consumption of the engine (fuel plus coolant) is quite high, the front compressor blades and vanes are subjected to impact by liquid droplets, all blades are eroded by the liquid, and smoke is often produced as a combustion product.

My solution to the compressor flow blockage problem is my recover bleed air engine wherein air is ducted from the compressor middle stages into the afterburner during supersonic, maximum power (point L) flight conditions, thus bypassing the flow restriction that exists in the rear compressor stages under such flight conditions. In the afterburner, the bleed air is brought up to the same energy level as that of the air that flows thru the turbojet. The afterburner is an integral component of my recover bleed air engine and is not merely a thrust augmenter as it is in the case of a conventional turbojet engine. Whereas the afterburner could be eliminated from the conventional turbojet engine, it can not be eliminated from my recovery bleed air engine for without the afterburner the bleed air could not be heated to the energy level of the engine airflow and most of the increase in thrust would be lost.

It was mentioned previously that the flow blockage caused in the rear stators of a conventional turbojet engine at point L maximum speed, maximum power condition, decreased thrust. In my reecover bleed air engine, the thrust increase relative to the conventional turbojet engine is approximately proportional to the increase in total corrected airflow which, in turn, is approximately proportional to the ratio of bypass flow to the main stream airflow. For example, if the bypass airflow is 20% of the main airflow, the increasee in gross thrust would be approximately 20%. Net thrust, the difference between gross thrust and drag thrust, may increase even more than 20 percent. This thrust advantage is obtained without an increase in either turbine inlet temperature or compressor rotor speed.

Figure 5:
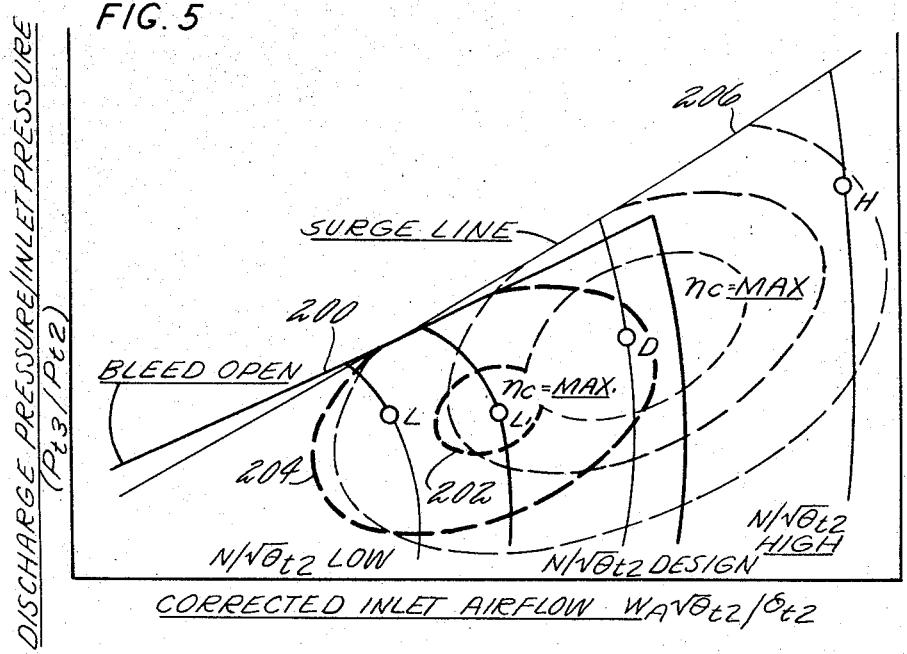
FIG. 5 is a compressor map of a turbojet engine compressor used with afterburning turbojet engine utilizing my invention, which compressor map is superimposed upon the FIG. 4 compressor map.

With respect to compressor surge margin, let us observe FIG. 5 which shows a compressor map representing my recover bleed air engine with the bleeds open in bold lines including surge line 200 and compressor adiabatic efficiency lines 202 and 204. In FIG. 5 my recover bleed air engine compressor map is imposed on the FIG. 4 map to illustrate the advantage obtained by my recover bleed air engine invention. It will be noted that point L of the FIG. 4 compressor map is a substantial distance to the left and hence a substantial distance closer to bleed closed surge line 206 than is corresponding point $L_1$ in my recover bleed air engine compressor map. This illustrates the compressor surge margin increase obtained by my invention and this increase is brought about by the fact that in the FIG. 4 of bleed closed embodiment, the compressor front stage airfoils are operating in stall with the air angle much less than optimum. With the bleed of my recover bleed air engine open, the compressor front stage corrected airflow increases as does the air angle so that the blades and vanes of the compressor front stages operate nearer optimum and farther away from stall. For this reason, the compressor stall margin is improved by my invention because this type of stall is triggered or precipitated by front stage stall.

With respect to compressor efficiency, my recover bleed air engine invention improves the efficiency in two areas. First, the front stages of the compressor operate more efficiently because of the improved air angles. Due to this improved performance in the compressor front stages, the air passing therethrough is compressed more and this in turn "unchokes" the rear stages to some degree. The second net compressor efficiency improvement comes from both improved front and rear stage efficiency and is reflected in overall engine efficiency improvement and decreased thrust specific fuel consumption.

With respect to the aforementioned blade and vane fatigue problem, my recover bleed air engine serves to eliminate stall and hence flutter in the compressor front stages thereby eliminating the blade vane fatigue caused by the flutter.

There are other advantages to be gained from my recover bleed air engine, for example, the weight of the bleed ducts is small because the bleed air is cool relative to burner temperature, and the high pressure volume airflow is small compared to the mainstream. Further, my new engine provides cool bleed air to the afterburners for cooling purposes. Additionally, under conditions where the extra thrust afforded by my new engine is not required, the compressor speed can be reduced significantly without reducing the thrust output below that maintained by a conventional turbojet. The resulting reduced compressor rotor speed increases compressor life and reduces the compressor design weight requirements. Further, due to the improved compressor performance at point $L_1$ (bleeds open), design point D can be moved to a high corrected airflow to favor the requirements at point H, thereby improving compressor performance at both extremes so as to improve engine performance. Beyond this, the extra surge margin provided by my engine can be employed to improve tolerance to compressor inlet distortion, or to improve engine performance by shifting the equilibrium points to high pressure ratios by reducing the turbine inlet area or the exhaust nozzle area.

The mechanism which constitutes my recover bleed air engine is best shown in FIG. 1.

As previously explained, by recover bleed air engine 10 comprises compressor 14, having forward, intermediate and after stages 11, 13 and 15 respectively, burner section 16, turbine section 18 and afterburner 20 all of generally circular cross-section and concentric about axis 22 and enveloped within case 24. To accomplish the air bleed and recovery function, applicant bleeds air from compressor intermediate section 13 into afterburner 20. As best shown in FIG. 1, this air bleed and recovery function may be accomplished by a plurality of ducts of generally circular cross section which are circumferentially positioned about and extend axially along engine 10 joining the compressor intermediate section 13 with the afterburner 20.

In my recover bleed air engine 10, after entering compressor section 14 through engine inlet 26, the engine gas may pass into afterburner 20 either through burner section 16 and turbine section 18 or through bleed ducts 40. The air which enters afterburner 20 by either of these routes preferably has fuel added thereto by a plurality of circumferentially positioned and radially extending fuel spray bars 30 which receive fuel from fuel ring manifold 32. Flameholders 34 perform the function of creating low turbulent air downstream thereto to establish a combustion zone 36, wherein the fuel-air mixture so created will burn to reheat the engine exhaust gases which are discharged into the afterburner 20 through turbine 18 and to also heat to the level of such exhaust gases the bypass or bleed air which enters afterburner 20 through bleed ducts 40. The air so heated is discharged to atmosphere through exhaust outlet 28 to perform a thrust generating function. Duct 40 communicates with the compressor immediately downstream of a stator and upstream of a rotor.

Flow through ducts 40 is desired only during the high flight speed, high power point L operating condition of engine 10 so that flow through ducts 40 is controlled to occur only at that time. As best shown in FIG. 1, Mach meter 52 of conventional design may be positioned to actuate valve 50 which is preferably at the downstream end of ducts 40. Mach meter 52 is so connected to valve 50 that the valve is open and flow is permitted through ducts 40 during high Mach number flight operation and the valve is otherwise closed.

Other methods of actuating valve 50 could be accomplished. One such method is shown in FIG. 3 wherein compressor inlet temperature is sensed by pick-up 150 and compressor rotor speed ($\eta$) is sensed by tachometer 154 and combined in control 152 to give corrected rotor speed $\eta/\sqrt{\theta_{t2}}$, where $\theta_{t2}$ is a function of compressor inlet temperature. For values of corrected rotor speed above a preselected value the control signals actuator 159 to close valve 50 and at lesser values of $\eta/\sqrt{\theta_{t2}}$ the valve 50 is open.

Another control is shown in FIG. 3a wherein compressor inlet static pressure ($P_{s2}$) is sensed by pick-up 166 and compressor inlet total pressure ($P_{t2}$) is sensed by pick-up 160 and combined as a ratio of static pressure divided by total pressure in control 162. For all values of the ratio $P_{s2}/P_{t2}$ the control signals actuator 169 to open the valve 50 above a pre-selected value and at lesser values to close the valve 50. The ratio of static pressure to total pressure is an indication of compressor inlet Mach number.

FIG. 2 shows an alternate method of ducting the recovery bleed air in which shroud 60 envelops engine case 24 from a position forward of compressor intermediate section 13 and extends rearwardly to afterburner 20, thereby forming an annular gas passage 61 in communication with compressor 14 at intermediate stage 13 and in communication with afterburner 20 along engine case 24, thereby not only bleeding air into the afterburner from the compressor intermediate stage but also serving to cool the afterburner walls by introducing the bleed air therealong. Obviously, bleed ducts 40 could also perform this afterburner wall cooling function.

Referring to FIG. 7 we see a preferred embodiment of my recover bleed air engine 10 wherein a plurality of circumferentially positioned and equally spaced ports 100 are positioned circumferentially about engine case 24 in radial alignment with compressor intermediate section 13. A flap 102 is pivotally connected at its forward end along line 104 so as to be movable between a first and closed position wherein flow from compressor intermediate stages 13 outwardly through ports 100 is blocked and to a second or open position wherein flow from the compressor through ports 100 is permitted. Actuation of flaps 102 may be accomplished through axially translatable ring 106 which is connected by linkage (not shown) to flaps 102 such that as operating ring 106 is translated forwardly to permit bleed airflow through ports 100 and such that the flaps 102 close to block bleed airflow when actuating ring 106 is translated rearwardly. Ring 106 is connected by a plurality of axially extending and circumferentially positioned rods 108 which carry servo-piston 110 thereon to be reciprocated within cylinder 112. In conventional fashion, by positioned pilot valve 116, the flow of air from high pressure line 118 can be conducted selectively to opposite sides of servo-piston 110 thereby causing flaps 102 to open or close.

After passing through ports 100, the air from the compressor intermediate stage enters annular chamber 120 which is defined between engine case 24 and substantially cylindrical shroud 122. The downstream end of annular chamber 120 is joined to a plurality of fish-tail inlets 124 which cooperate with adjacent inlets 124 to sealably engage annular chamber 120 to receive all bleed air being passed therethrough. A plurality of guide or turning vanes 126 are positioned within fish-tail inlet 124 to smoothly guide the bleed air into ducts 40 which are of substantially circular cross section. Preferably, ducts 40 include an expansion joint 130, which may be a bellows-type arrangement, to permit relative thermal expansion between the bleed apparatus and the engine proper. At the downstream end of duct 40 the bleed air is again conducted within engine case 24 and into annular chamber 132 which is defined between engine case 24 and afterburner baffle 134. The bleed air continues to flow rearwardly through annular cavity 132 and a portion of it enters afterburner chamber or cavity through aperture 136 which is defined by the axial spacing which exists between afterburner baffle 134 and perforated afterburner cooling shroud 138. The remainder of the cooling air passes between engine case 24 and cooling shroud 138 and eventually into afterburner cavity 20 for reheating therein through the perforations in cooling wall 138.

It is to be understood that the invention is not limited to the specific embodiment herein illustrated and described but may be used in other ways without departure from its spirit as defined by the following claims.

I claim:
1. A recover bleed air engine comprising a compressor having forward, intermediate and rear stages, a turbine spaced rearward of said compressor, a combustion chamber between said compressor and turbine, an afterburner downstream of said turbine, an engine case enveloping said compressor, combustion chamber, turbine and afterburner and having an inlet and an outlet so that air which enters said inlet is compressed in said compressor, heated in said combustion chamber, has energy extracted therefrom by said turbine, and is reheated in said afterburner before discharge to atmosphere through said outlet to generate thrust, and means responsive to supersonic flight speed to bleed air from said compressor intermediate stage and discharge said bleed air into said afterburner for reheating.

2. A recover bleed air engine comprising a single rotor compressor having forward intermediate and rear stages, a turbine spaced rearward of said compressor, a combustion chamber between said compressor and turbine, an afterburner downstream of said turbine, an engine case enveloping said compressor, combustion chamber, turbine and afterburner and having an inlet and an outlet so that air which enters said inlet is compressed in said compressor, heated in said combustion chamber, has energy extracted therefrom by said turbine, and is reheated in said afterburner before discharge to atmosphere through said outlet to generate thrust, and means responsive to supersonic flight speed to bleed air from said compressor intermediate stage at maximum power engine operating condition and discharge said bleed air into said afterburner for reheating.

3. A recover bleed air engine comprising a single rotor compressor having forward intermediate and rear stages, a turbine spaced rearward of said compressor, a combustion chamber between said compressor and turbine, an afterburner downstream of said turbine, an engine case enveloping said compressor, combustion chamber, turbine and afterburner and having an inlet and a variable area outlet so that air which enters said inlet is compressed in said compressor, heated in said combustion chamber, has energy extracted therefrom by said turbine, and is reheated in said afterburner before discharge to atmosphere through said outlet to generate thrust, and means responsive to supersonic flight speeds by sensing the pressure in said compressor rear stage to bleed air from said compressor intermediate stage at maximum power engine operating condition and discharge said bleed air into said afterburner for reheating.

4. Apparatus according to claim 1 wherein said recover bleed air means includes a plurality of circumferentially positioned, axially extending ducts extending from said compressor intermediate stage to said afterburner and communicating with each.

5. Apparatus according to claim 1 wherein said recover bleed air means includes an annular passage extending between and communicating with said compressor intermediate stage and said afterburner.

6. A recover bleed air engine comprising a compressor having forward, intermediate and rear stages, a turbine spaced rearward of said compressor, a combustion chamber between said compressor and turbine, an afterburner downstream of said turbine, an engine case enevloping said compressor, combustion chamber, turbine and afterburner and having an inlet and a variable area outlet so that air which enters said inlet is compressed via said compressor, heated in said combustion chamber, has energy extracted therefrom by said turbine, and is reheated in said afterburner before discharge to atmosphere through said outlet to generate thrust, said afterburner including a substantial cylindrical apertured cooling baffle defining an annular cooling air chamber with said engine case, and means to bleed air from said compressor intermediate stage at high Mach flight speed, maximum power engine operating condition and discharge said bleed air into said afterburner for reheating comprising a plurality of circumferentially positioned ports in said engine case at said compressor intermediate stage, a plurality of flaps pivotally attached to said engine case and actuatable between a first position wherein said flaps block flow through said ports and a second position wherein said flaps permit flow through said ports, means to so actuate said flaps, a shroud cooperating with said engine case to define an annular chamber enveloping said ports and flaps and connected to said engine case at its forward end and having an annular outlet at its after end, a plurality of circumferentially positioned and substantially axially extending ducts having a forward end positioned downstream of said annular outlet and an after end communicating with said afterburner radially outward of said cooling baffle and including an expansion joint between said forward and after ends, a fish-tail shaped connecting member having an after end connected to the forward end of one of said ducts and a forward end defining an elongated arcuate aperture sealably connected to said annular chamber outlet and including a plurality of flow directing vanes shaped to cause the air which enters said annular chamber through said ports to smoothly flow into said ducts.

References Cited
UNITED STATES PATENTS

| | | | |
|---|---|---|---|
| 2,464,724 | 3/1949 | Sedille | 60—35.6 |
| 2,653,446 | 9/1953 | Price | 60—262 |
| 2,703,477 | 3/1955 | Anxionnaz | 60—35.6 |
| 2,929,203 | 3/1960 | Henning et al. | 60—35.6 |
| 2,978,865 | 4/1961 | Pierce | 60—35.6 |

MARK M. NEWMAN, *Primary Examiner.*

SAMUEL FEINBERG, *Examiner.*

V. R. PENDEGRASS, D. HART, *Assistant Examiners.*